United States Patent [19]

Cepkauskas

[11] 4,073,684
[45] Feb. 14, 1978

[54] RELEASABLE EXTENSION SHAFT COUPLING

[75] Inventor: Martin D. Cepkauskas, Simsbury, Conn.

[73] Assignee: Combustion Engineering, Inc., Windsor, Conn.

[21] Appl. No.: 727,068

[22] Filed: Sept. 27, 1976

[51] Int. Cl.² ............................................... G21C 7/10
[52] U.S. Cl. .............................. 176/86 R; 176/36 R; 176/36 C; 176/36 S
[58] Field of Search ................. 176/86 R, 36 R, 36 C, 176/36 S

[56] References Cited

U.S. PATENT DOCUMENTS

| 3,346,459 | 10/1967 | Prince et al. | 176/36 R |
| 3,849,257 | 11/1974 | Bevilacqua | 176/86 R |
| 3,857,599 | 12/1974 | Jones et al. | 176/86 R |

Primary Examiner—Harvey E. Behrend
Attorney, Agent, or Firm—Arthur L. Wade

[57] ABSTRACT

The control element assembly in a nuclear reactor is connected to its extension shaft by spring collet structure whose sections are locked to the extension shaft by a plunger actuated by a spring which is also a part of the buffer mechanism of the assembly.

3 Claims, 2 Drawing Figures

RELEASABLE EXTENSION SHAFT COUPLING

BACKGROUND OF THE INVENTION

1. Field of the Invention

The invention relates to connecting and disconnecting a nuclear reactor control element assembly with its drive extension shaft through actuation of a spring which is part of the buffer mechanism. More particularly, the invention relates to coupling structure between a drive extension shaft and nuclear reactor control element assembly which is locked by the spring of the buffer mechanism.

2. Description of the Prior Art

In a nuclear reactor, control elements are inserted into the core, of fuel region, of the reactor to control and regulate its reactivity and power level. These control elements contain materials known as poisons which absorb neutrons and lower the local neutron flux. In normal operation, the control elements are withdrawn, at least partially, from the core region, and their position may be controlled to regulate the reactor. In the event of an emergency in which the reactor must be shut down, it is necessary to rapidly insert most, or all, of these control elements fully into the core. This emergency procedure of inserting control elements is termed "scramming".

Control elements which enter the reactor core from above, and are withdrawn from the core to a position thereabove, can be scrammed by allowing the control elements to fall into the core by the forces of gravity. This is normally accomplished by simply disengaging the control elements and drive train from the drive mechanism. It is necessary, however, to provide means for gradually slowing down or decelerating the control elements just prior to their reaching their extreme lower position in the core to prevent damage to the reactor structure or to the control elements. These decelerating structures are termed buffer mechanisms.

Various buffer mechanisms associated with individual control elements or with a control element assembly, including a plurality of control elements, have been provided to effect the controlled deceleration of the control elements. One type of buffer mechanism often used is that of a piston and cylinder combination. The piston, or cylinder, is fixed to the core structure and the cylinder, or piston, is carried by the control element assembly. Fluid in the reactor is in the cylinder when the control element assembly is suspended above the reactor core. When the assembly is allowed to fall (scram), the piston-cylinder engages and the fluid in the cylinder acts upwardly against the falling control element to effect a gradual deceleration of the control assembly. In addition to this fluid force, a spring is positioned in the cylinder to exert its force against the end of the piston and the structure on which the cylinder is mounted.

System 80 nuclear reactors use a particular form of piston-cylinder buffer mechanism between their control element assemblies and the core structure. This form is disclosed in United States patent application Ser. No. 546,410 filed Feb. 3, 1975 for the invention entitled "Shock Buffer for Nuclear Control Element Assembly" and the disclosure of that application is hereby incorporated by reference. In general, the spider of the control element assembly descends on a buffer pin which fits, as a piston, into a dashpot cylinder of the spider.

The normal positioning of the control element assembly is with a drive mechanism on the exterior of the reactor vessel. From the drive mechanism a drive extension shaft extends through the reactor vessel head to connect with the spider. Specifically, on the upper side of the spider is a ball. On the end of the extension shaft is a releasable gripper, or collet fingers, which capture the spider ball. These collet fingers, as a releasable gripper, are normally disengaged from the spider ball preparatory to refueling.

The present coupling system requires an operating rod to actuate the gripper of each drive extension shaft. As there are up to ninety-seven control rod drive mechanisms for each System 80 reactor, there is a significant saving potential in providing a single operating rod to release the grippers of all drive extension shafts. At the same time, if the buffer mechanism is rearranged to apply a single spring force to the gripper, in locking the extension shaft to the control rod spider, and the buffering, further savings and simplification can be realized.

SUMMARY OF THE INVENTION

It is a principle object of the invention to position a single spring to exert its force on the collet fingers mounted on a nuclear reactor control element assembly so they will lock to the drive extension shaft for the assembly and the buffering mechanism.

Another object of the invention is to unlock the collet fingers of a plurality of nuclear reactor control element assemblies from their respective grippers with a single operating rod.

The present invention contemplates collet fingers mounted on the spider of a nuclear reactor control element assembly and a collet gripper formed in the lower end of the drive extension shaft for the assembly to lock to the gripper when its collet fingers are spread. A coupling lock plunger is positioned within the collet fingers and spreads the fingers into their locking engagement with the gripper on the extension shaft when moved upward by a spring force. The spring arranged to exert its force upward, on the plunger, to spread to collet fingers also exerts its force downward on the piston of the buffer mechanism.

The invention further contemplates the plunger being forced downward by an operating rod to overcome the spring force exerted uoward on the plunger. Therefore, a single operating rod can be used to unlock any number of collet-gripper connections between nuclear reactor control assemblies and their drive extension shafts.

Other objects, advantages and features or the invention will become apparent to one skilled in the art upon consideration of the written specifications, appended claims, and attached drawing.

DRAWING DESCRIPTION

FIG. 1 is a sectioned elevation of the spider of a nuclear reactor control element assembly connected to a control rod drive extension shaft in which the invention is embodied; and FIG. 2 is similar to FIG. 1 the spider being disconnected from the shaft.

DESCRIPTION OF THE PREFERRED EMBODIMENT

Figure 1:
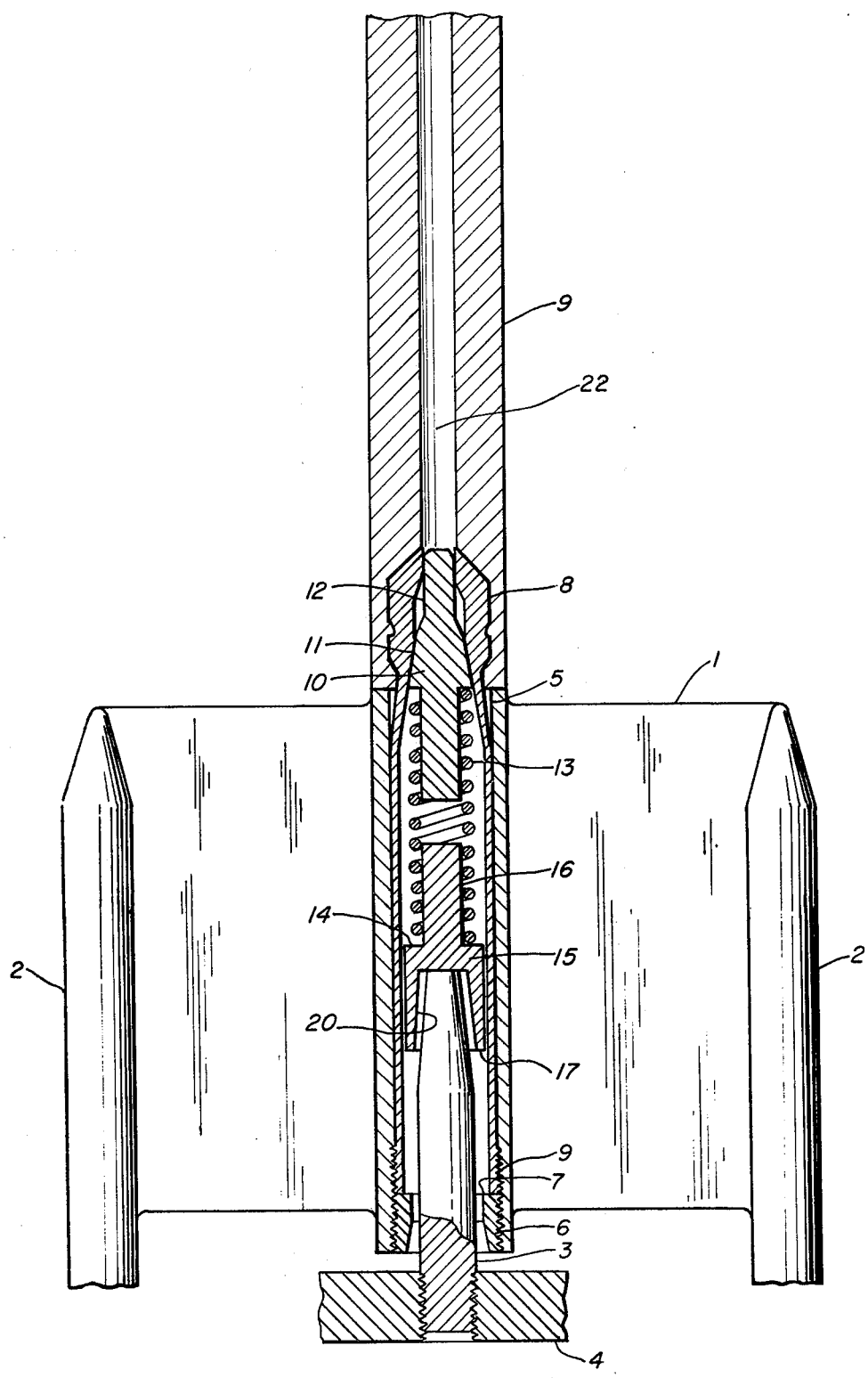

Although the present invention is in a structure which is very important to the operation of a nuclear reactor, it is not necessary to disclose the overall arrangement of a reactor installation to teach the invention. Even disclosing the reactor vessel itself is not necessary for one skilled in this art.

There is a Control Rod Drive Mechanism (CRDM) located on the exterior of the head of the reactor vessel. This structure is also not needed for the disclosure, although each control rod drive extension shaft extends from the CRDM, through the vessel head to connect with a Control Element Assembly (CEA).

Under normal operation of the nuclear reactor, the CEA is continuously engaged with the CRDM through the control rod drive extension shaft and is reciprocated upwardly or downwardly as needed in a controlled and relatively slow manner. However, in the event of an emergency, the control rod drive extension shaft will be disengaged, or released, from the CRDM thereby permitting it and the CEA to descend rapidly under the influence of gravity to a fully, or nearly fully, inserted position within the reactor core. This operation, termed a scram, permits rapid insertion of the control elements into a fuel assembly of the core. In order to prevent damage to the CEA and/or fuel assembly, it is necessary to gradually decelerate the control element assembly prior to its attaining the normally fully inserted position. This is accomplished by means of the buffer of CEA which effects this deceleration near the lower or fully inserted extent of travel of the CEA.

In the present disclosure, it is the coupling on the lower end of the control rod drive extension shaft where the present invention enters the picture. For this reason it is the lower end, the end within the vessel, of this extension shaft that is shown in the drawings. To this extension shaft the so-called spider of the CEA is normally coupled.

In the work cycle of the nuclear reactor there arrives the period in which fuel pin assemblies are shifted in the core. It is then each extension shaft is deconnected from its spider.

The collet-collet gripper connection is actuated into its disconnected position. The disconnected extension shaft is removed from the reactor vessel, while the fuel assemblies are shuffled. Reconnection of the extension shaft to the CEA spider then takes place by actuation of the collet-collet gripper. Therefore, the drawings are limited to the structure at the lower end of the control rod drive extension shaft and CEA spider which embody the invention.

Figure 2:
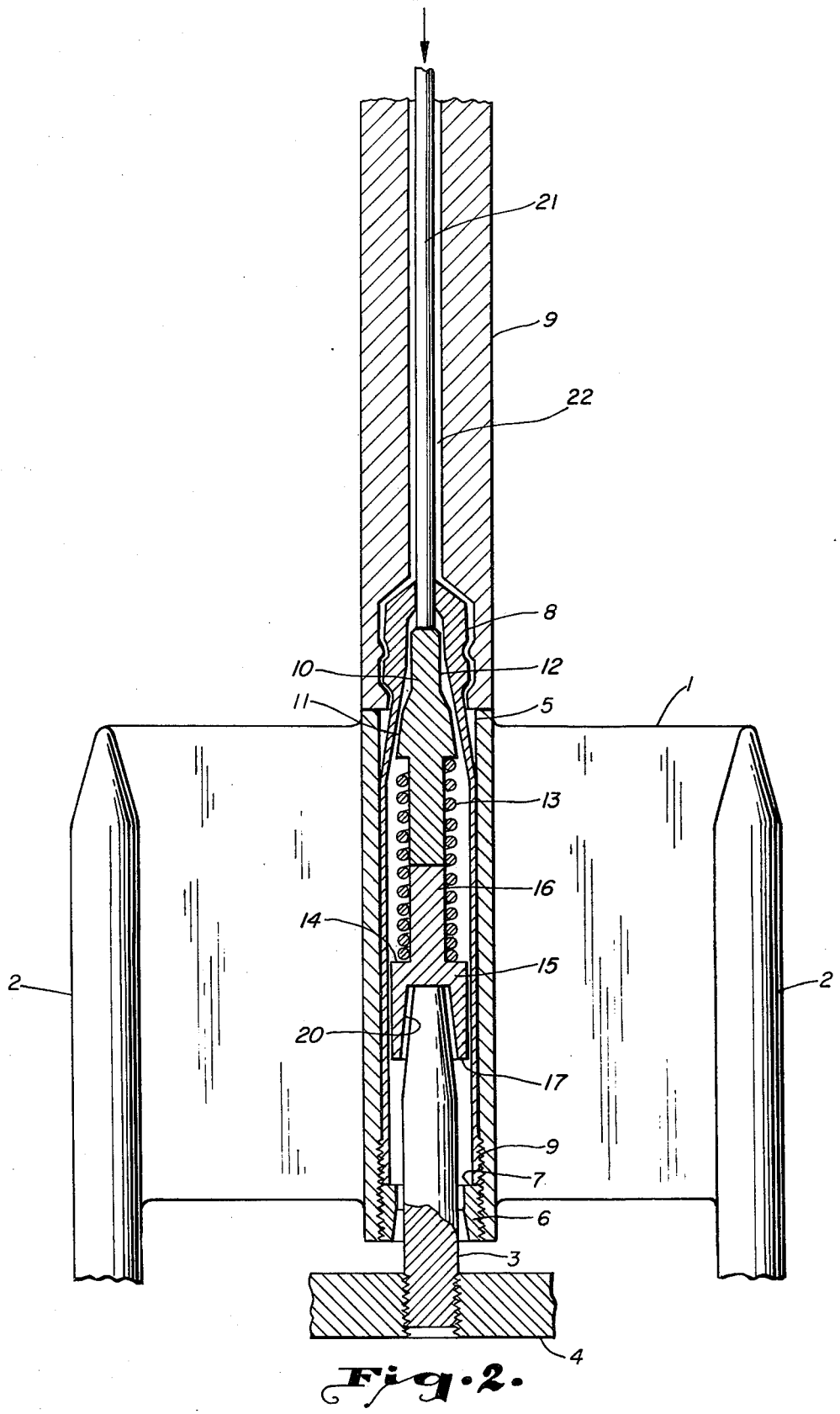

FIG. 1 discloses the shaft connected to the spider and FIG. 2 shows them disconnected. In these drawings, spider 1 supports control rods 2 extending downwardly into the assembly of fuel pins below the view of this drawing. Buffer pin 3 extends upwardly as a part of the dashpot structure to slow the descent of the CEA to the lower position shown in the drawings.

More specifically, buffer pin 3 is mounted on support plate 4. Plate 4 has a fixed position above the assembly of fuel pins to index the limits of downward movement provided for the CEA. As the CEA descends, upon scram, pin 3 is received within the bore 5 of spider 1.

Insert collar 6 is threaded into the lower end of spider bore 5. The bore of collar 6 is flared to receive the pin 4. The upper surface 7 of collar 6 is provided as a lower stop for the reciprocating mechanism within spider bore 5.

Collet fingers 8 are inserted into the upper end of bore 5 and threaded to the walls of bore 5 at 9. The fingers extend above the spider bore 5 for coupling to the lower end of extension shaft 9. These fingers 8 are shaped in segments which move toward the axis of the spider bore 5 if a force is not applied to them laterally, from the bore axis. As an assembly, the fingers collapse toward the spider bore axis or they open outward when forced from the spider bore axis.

The lateral force applied to collet fingers 8 is developed with a plunger 10 having downwardly flaring surface 11 and upwardly extending neck 12 which is guided in bore 8. When this plunger 10 is forced upward, into the position disclosed in FIG. 1, the flared surface 11 engages the internal sides of collet fingers 8 and forces them laterally outward into the disclosed engagement with the grooves of the lower end of shaft 9.

Plunger 10 is positioned upward, into the position disclosed in FIG. 1, by spring 13. The upper end of spring 13 bears upon the lower end of plunger 10. The lower end of spring 13 bears upon the inset surface 14 of piston 15. Thus, one function of spring 13 is to provide the upwardly directed force on plunger 10 to lock, or couple, shaft 9 to spider 1. If the force of spring 13 is overcome by a downwardly directed force applied to the top of plunger 10, the plunger will be forced downward, collet fingers 8 will collapse inwardly and disengage from the grooves in the lower end of shaft 9.

Buffer piston 15 is formed with a neck 16 extended well up into the lower end of spring 13. The lower end 17 of piston 15 is formed to rest upon surface 7 of insert collar 6. As disclosed, buffer pin 3 extends through collar 6 and up into bore 20 which is formed up into piston 15. In moving piston 15 from its lower position to the upper position shown in FIG. 1, spring 13 is compressed against surface 14 and generates the buffer force between buffer pin 3 and spider 1. Thus spring 13 serves two purposes. First, spring 13 couples shaft 9 to spider 1. Second, spring 13 generates the buffer force between pin 3 and spider 1. This dual function of single spring 13 is made possible by the organization of spring 13 placed in the axial bore of spider 1 to bear upwardly on the connecting structure and downwardly on the buffing structure.

FIG. 2 is established to disclose the simplicity of the disconnect arrangement. When it is time to disconnect, rod 21 is extended down bore 22 of shaft 9 to engage the upper end of plunger 10. The force applied to the upper end of plunger 10, with rod 21, is great enough to overcome the upward force applied to the lower end of plunger 10 by spring 13. The result is a downward movement of plunger 10, a release from the lateral force on collet fingers 8 applied by surface 11 and a resulting disconnection of shaft 9 from spider 1.

The rod 21 may then be withdrawn from bore 22 and used to disconnect other extension shaft assemblies from their spiders. Reconnection is made by centering the bore 20 over the tapered ends of collet fingers 8 and inserting rod 21 down bore 22 to bear against the end of plunger 10 and force it to the position disclosed in FIG. 2. Collet fingers 8 will relax inwardly so the end of shaft 9 can be brought against spider 1 as in FIG. 1. Upward removal of rod 21 will then allow spring 13 to move plunger 10 to the FIG. 1 position in reconnection of shaft to spider.

The prior art does not disclose the simple arrangement of a single spring providing both the locking force and buffer force in a nuclear control element assembly. Further, the prior art does not disclose an arrangement wherein a single actuating rod 20 may be inserted into the reactor vessel to disconnect any number of control element assemblies from their drive extension shafts.

Finally, another advantage over the prior art is the application of a positive downward force, through the actuating rod, on the spider of the CEA during the decoupling, or disconnection.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not a limiting sense.

The invention, having been described, what is claimed is:

1. In a nuclear reactor, a control element assembly, including,
   a spider from which the control rod assembly depends,
   an axial bore in the spider,
   collet fingers attached to the spider at a position within the spider bore with their upper ends extended above the spider,
   a plunger positioned within the upper ends of the collet fingers to carry a flared surface of the plunger against the internal surface of the collet fingers in applying a lateral force to the fingers when the plunger is moved upward,
   a buffer pin fixedly attached to a support plate in the nuclear reactor for cooperation with said control element assembly,
   a piston positioned within the axial bore of the spider below the plunger for engagement with said buffer pin inserted into the spider bore from below,
   and a spring element positioned in the axial bore of the spider to extend between the plunger and piston and exert its force on both,
   such that collet fingers are spread into engagement with a collet gripper on a control rod extension shaft assembly and the piston exerts a buffer force on said buffer pin contacting the piston from below.

2. The nuclear reactor of claim 1, including,
   said extension shaft assembly positioned to extend downwardly from above the spider and having an axial bore in the lower end of which the collet gripper is formed,
   and a control rod extended down the axial bore to engage the plunger and with which to move the plunger downward to remove the flared surface of the plunger from the internal surface of the collet fingers so the collet fingers will collapse and disengage from the collet gripper.

3. In a nuclear reactor, a control element assembly, including,
   a spider from which the control rod assembly depends,
   an axial bore through the spider,
   a piston in the axial bore urged downward toward a seat surface within the bore,
   a buffer pin fixedly attached to a support plate in the nuclear reactor for cooperation with said control element assembly,
   a buffer pin mounted below the spider and extending up into the axial bore of the spider to engage the piston,
   a spring positioned within the axial bore of the spider to urge the piston downward,
   a plunger positioned within the axial bore of the spider and engaged by the spring to be urged upward,
   collet fingers mounted by their lower ends to a lower position within the axial bore and extending teeth on their upper ends above the spider and axial bore,
   a control rod extension shaft with an axial bore extending its lower end downward to receive the upper ends of the collets within the axial bore of the shaft in which grooves are formed to grip the collet teeth,
   a surface on the plunger formed to flare downwardly so as to engage the collet fingers and flare them outwardly into engagement with the grooves of the shaft bore when the plunger is moved upwardly by the spring,
   and a rod extending downwardly in the axial bore of the shaft to engage the plunger and move the plunger downwardly against the spring force and thereby remove the plunger surface from the collet fingers so the collet fingers will collapse together and disengage the shaft grooves.

* * * * *